(12) United States Patent
Kajio

(10) Patent No.: US 9,187,021 B2
(45) Date of Patent: Nov. 17, 2015

(54) ASSIST GRIP

(71) Applicant: Hideki Kajio, Toyota (JP)

(72) Inventor: Hideki Kajio, Toyota (JP)

(73) Assignee: HOWA PLASTICS CO., LTD., Toyota-Shi, Aichi (JP)

( * ) Notice: Subject to any disclaimer, the term of this patent is extended or adjusted under 35 U.S.C. 154(b) by 0 days.

(21) Appl. No.: 14/352,297

(22) PCT Filed: Apr. 17, 2013

(86) PCT No.: PCT/JP2013/061405
§ 371 (c)(1),
(2) Date: Apr. 16, 2014

(87) PCT Pub. No.: WO2013/187122
PCT Pub. Date: Dec. 19, 2013

(65) Prior Publication Data
US 2015/0232011 A1    Aug. 20, 2015

(30) Foreign Application Priority Data
Jun. 12, 2012 (JP) .................................. 2012-133118

(51) Int. Cl.
*B60N 3/02* (2006.01)

(52) U.S. Cl.
CPC ....................................... *B60N 3/02* (2013.01)

(58) Field of Classification Search
CPC ........... B60N 3/02; B60N 3/023; B60N 3/026
USPC ....................................................... 296/1.02
See application file for complete search history.

(56) References Cited

U.S. PATENT DOCUMENTS

| 5,975,606 | A | * | 11/1999 | Forbes et al. | 296/1.02 |
| 6,715,812 | B2 | * | 4/2004 | Sakuma et al. | 296/1.02 |
| 7,103,939 | B2 | * | 9/2006 | Belchine et al. | 16/412 |
| 7,594,684 | B2 | * | 9/2009 | Hidaka et al. | 296/1.02 |
| 8,146,208 | B2 | * | 4/2012 | Kajio et al. | 16/444 |
| 2002/0021014 | A1 | * | 2/2002 | Sakuma et al. | 296/1.1 |
| 2005/0091798 | A1 | | 5/2005 | Belchine, III et al. | |

(Continued)

FOREIGN PATENT DOCUMENTS

| JP | 20030214468 A | 7/2003 |
| JP | 3774845 B | 8/2003 |

(Continued)

OTHER PUBLICATIONS

Japanese Patent Office, Japanese Search Report for Japanese Patent Application No. PCT/JP2013/061405, filed Apr. 17, 2013.

(Continued)

*Primary Examiner* — Gregory Blankenship
(74) *Attorney, Agent, or Firm* — Ingrassia Fisher & Lorenz, P.C.

(57) ABSTRACT

In a pivot support portion of a hinge assembly of an assist grip, an outer support and an inner support are provided at a distance from each other. Between the inner support and the outer support, a double torsion spring stored in a spring case is inserted, and the grip body is biased toward a non-use position side by the double torsion spring. An opening is formed in a middle portion of the spring case. Legs at both sides of the double torsion spring are retained at the inside of the spring case. A middle leg of the double torsion spring projects from the opening of the spring case to be retained by a part of the grip body.

6 Claims, 17 Drawing Sheets

(56) References Cited

U.S. PATENT DOCUMENTS

| | | | |
|---|---|---|---|
| 2007/0102944 A1* | 5/2007 | Kato et al. | 296/1.02 |
| 2008/0018128 A1* | 1/2008 | Yamagiwa et al. | 296/1.02 |
| 2009/0295180 A1* | 12/2009 | Boehner et al. | 296/1.02 |
| 2010/0175220 A1* | 7/2010 | Kajio et al. | 16/110.1 |
| 2011/0225771 A1* | 9/2011 | Bartnick | 16/429 |
| 2011/0285160 A1* | 11/2011 | Bartnick | 296/1.02 |
| 2012/0080898 A1* | 4/2012 | Kajio et al. | 296/1.02 |
| 2012/0319421 A1* | 12/2012 | Ruzich et al. | 296/1.02 |
| 2013/0019437 A1* | 1/2013 | Takai et al. | 16/429 |
| 2015/0102620 A1* | 4/2015 | Ichioka et al. | 296/1.02 |

FOREIGN PATENT DOCUMENTS

| | | |
|---|---|---|
| JP | 2005138823 A | 6/2005 |
| JP | 20100159032 A | 7/2010 |

OTHER PUBLICATIONS

European Patent Office, Extended European Search Report for Application No. 13 80 4549.7-1754 mailed Jul. 17, 2015.

* cited by examiner

// ASSIST GRIP

CROSS-REFERENCE TO RELATED APPLICATION

This application is a U.S. National-Stage entry under 35 U.S.C. §371 based on International Application No. PCT/JP2013/61405, filed Apr. 17, 2013 which was published under PCT Article 21(2) and which claims priority to Japanese Patent Application No. 2012-133118, filed Jun. 12, 2012, which are all hereby incorporated in their entirety by reference.

TECHNICAL FIELD

This technical field relates to an assist grip to be mounted on a ceiling surface or the like inside a vehicle compartment, and more particularly, to an assist grip a grip body of which is secured to a mounting location inside the vehicle in a rotatable fashion via a hinge assembly.

BACKGROUND

Assist grips are installed on a ceiling surface inside a vehicle compartment to provide a support for vehicle occupants in the compartment. This kind of assist grips having such a structure that cavities are formed at opposite sides of a grip body and hinge assemblies are installed in the cavities in a rotatable fashion, and the grip body is rotatably mounted via the hinge assemblies have been mounted in various automobiles.

On the hinge assembly of this kind of assist grip, as shown in, for example, JP3774845 B, a torsion coil spring for biasing around a hinge shaft thereof is mounted so as to bias the grip body toward a non-use position relative to the hinge assembly by a spring force of the torsion coil spring.

The torsion coil spring to be mounted on the hinge assembly is usually arranged between a pair of supports provided in a projecting manner at a lower portion of the hinge assembly, and is mounted in a space between the supports, with one end of the spring being engaged with the hinge assembly, and the other end of the spring being engaged with the grip body.

The torsion coil spring, at the time of assembly, while biasing the grip body up to the non-use position relative to the hinge assembly, is to be attached between a pair of supports at the lower portion of the hinge assembly, however, the torsion coil spring needs to be oriented in a predetermined direction as its direction and mounted being biased in a torsional state, and thus the work for attaching a small-sized torsion coil spring into such a configuration by hand is troublesome and difficult.

Moreover, the space between the supports of the hinge assembly in the hinge cavity of the grip body is large relative to an external shape of the torsion coil spring, and a considerable clearance is interposed around the spring. Therefore, the torsion coil spring inserted between the supports is likely to be mounted obliquely shifted from an axial center position of the hinge shaft in terms of a mounted state thereof.

Therefore, when the torsion coil spring is attached in an inclined manner between the pair of supports of the hinge assembly, it is difficult to exert a constant torsional torque to the hinge assembly in a torsional direction thereof, and rotational torque between the hinge assembly and the grip body by the torsion coil spring varies for every product, so that it becomes difficult to manage the rotational torque of the hinge assembly at a previously set constant value. Moreover, when the torsion coil spring is attached with its axis obliquely shifted with respect to the hinge shaft of the hinge assembly on which the torsion coil spring is mounted, noise is likely to occur due to friction between coil wires or due to friction between the torsion coil spring and a wall surface of the hinge cavity of the grip body when the grip body is operated to rotate relative to the hinge assembly.

An assist grip arranged is described in JP2010-159032 A such that a torsion coil spring that biases the grip body to the non-use position relative to the hinge assembly is stored in a cylindrical spring case, and the spring case storing the torsion coil spring is mounted to the inside of the hinge assembly.

The assist grip structured such that the spring case storing the torsion coil spring is mounted to the inside of the hinge assembly allows assembling in positional alignment relatively easily when mounting the spring case to the inside of the hinge assembly, but the torsion coil spring is twisted between one and the other ends thereof when the grip body rotates from the non-use position to the in-use position in use, and the coil spring is loaded in a direction to incline its axis, so that the torsional coil spring is likely to be inclined. Therefore, when the torsion coil spring is inclined in its posture along the axis, an outer peripheral portion of the coil spring slidingly contacts an inner surface, sliding contact further occurs between coil wires, and there has still been a problem that rotational force of the grip body by a spring force of the torsional coil spring is likely to become unstable.

The present invention has been made in view of the problems described above, and at least one object thereof is to provide an assist grip capable of stably exerting a rotational force of the grip body by a spring force. Furthermore, other objects, desirable features and characteristics will become apparent from the subsequent summary and detailed description, and the appended claims, taken in conjunction with the accompanying drawings and this background.

SUMMARY

In order to achieve the above-described object, an assist grip of an embodiment is an assist grip in which hinge cavities are provided on opposite bases of a grip body and hinge assemblies are rotatably pivotally supported inside the hinge cavities at opposite sides, respectively, which is secured to mounting locations inside a vehicle via the hinge assemblies, and for which in a pivot support portion of the hinge assembly, an outer support and an inner support are provided at a distance from each other, a spring case storing a spring is inserted in a non-rotating state between the inner support and outer support, and the grip body is biased toward a non-use position side by the spring, wherein a double torsion spring is stored inside the spring case as the spring, legs at opposite sides of the double torsion spring are retained at an inside of the spring case, and a middle leg of the double torsion spring projects from the spring case to be retained by a part of the grip body.

When being twisted in response to a rotation of the grip body, the double torsion spring is wound at coil portions provided on both sides of the middle leg in mutually opposite directions, and thus the assist grip keeps an axially appropriate cylindrical shape without inclination in the spring portion while being twisted. Therefore, when the grip body rotates, the double torsion spring does not slidingly contact the spring case or the coil wires do not slidingly contact each other, and a stable rotational torque can be exerted to the grip body, and also, frictional wear of the spring member and spring case can be prevented to prevent the occurrence of noise.

Here, it can be configured such that the spring case is made up of an upper case and a lower case fitted with the upper case at a lower side, an opening is provided in a middle portion between the upper case and the lower case, and the middle leg of the double torsion spring projects from the opening.

According to this, in assembly of the spring case, simple work of only placing the double torsion spring inside the lower case and covering the same from above with the upper case for assembly allows assembling the double torsion spring to an appropriate position in the spring case and assembling the double torsion spring with an appropriate urging force generated, and thus assembling workability in manufacturing can be greatly improved.

Moreover, the above-described assist grip can be configured such that a boss hole is provided at an inside of an axial center position of the outer support serving as the pivot support portion of the hinge assembly, a boss portion is provided in a projecting manner on an end face of the spring case, and the boss portion of the spring case is fitted into the boss hole of the outer support to assemble the spring case between the inner support and the outer support of the hinge assembly. According to this, the spring case storing the double torsion spring can be simply mounted in axial alignment with an axial center position between the inner support and the outer support of the hinge assembly.

Also here, it can be configured such that the upper case and the lower case of the spring case are provided at parts to be fitted with each other with a plurality of retaining pawls and a plurality of retention portions, and the upper case and the lower case of the spring case, which have stored the double torsion spring, are fitted by making the retaining pawls be retained by the retention portions. According to this, in assembly work of the assist grip, the double torsion spring can be simply stored inside the spring case to be assembled to the inside of the hinge body of the hinge assembly.

Moreover, it is preferable that the double torsion spring with a torsion spring force generated by twisting between its middle leg and legs at opposite sides is stored inside the spring case. According to this, the double torsion spring is stored, inside the spring case, with a torsion spring force generated, and thus when the spring case is stored inside the hinge body of the hinge assembly, it can be assembled, exerting an appropriate spring force to the grip body.

Moreover, the above-described assist grip can be configured such that the double torsion spring is stored in the spring case by making one retaining pawl of the upper case or the lower case be retained by one retention portion of the lower case or the upper case with the double torsion spring provisionally stored inside the upper case, and then moving the lower case to twist the double torsion spring so as to generate a torsion spring force, while making the other retaining pawl be retained by the other retention portion. According to this, in manufacturing, a torsion spring force can be generated by only slightly twisting the double torsion spring stored inside the spring case, and thus the double torsion spring with a torsion spring force generated can be very simply assembled to the inside of the spring case.

According to the assist grip of the present invention, a rotational torque of the grip body can be stably exerted by a spring force of the double torsion spring, and frictional wear of the spring coil wires with each other and frictional wear of the inner surface of the spring case can be prevented to prevent the occurrence of noise when the spring causes friction. Moreover, the double torsion spring can be simply stored inside the spring case for assembly, and in manufacturing of the assist grip, man-hours for the assembling work thereof can be reduced to effectively manufacture an assist grip.

BRIEF DESCRIPTION OF DRAWINGS

The present invention will hereinafter be described in conjunction with the following drawing figures, wherein like numerals denote like elements and:

FIG. 21(*b*) is a right side view of the upper case;

FIG. 21(*c*) is a plan view of the upper case;

FIG. 21(*d*) is a bottom view of the upper case;

FIG. 22(*b*) is a right side view of the lower case; and

FIG. 22(*c*) is a plan view of the lower case.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
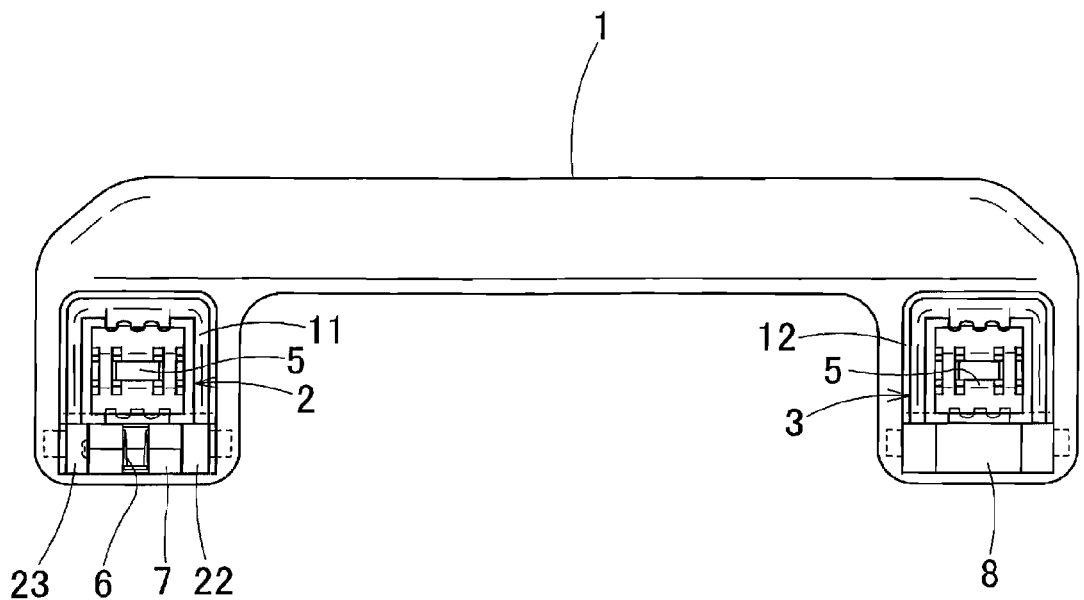
FIG. 1 is a back view of an assist grip showing an embodiment.
Figure 2:
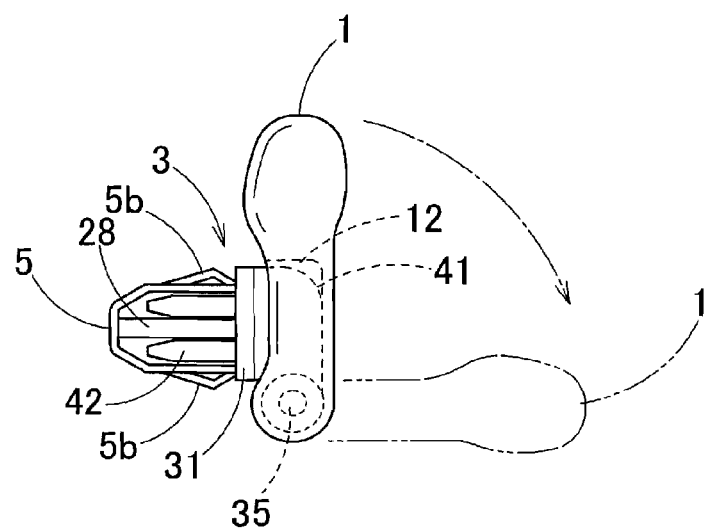
FIG. 2 is a left side view of the assist grip.
Figure 3:
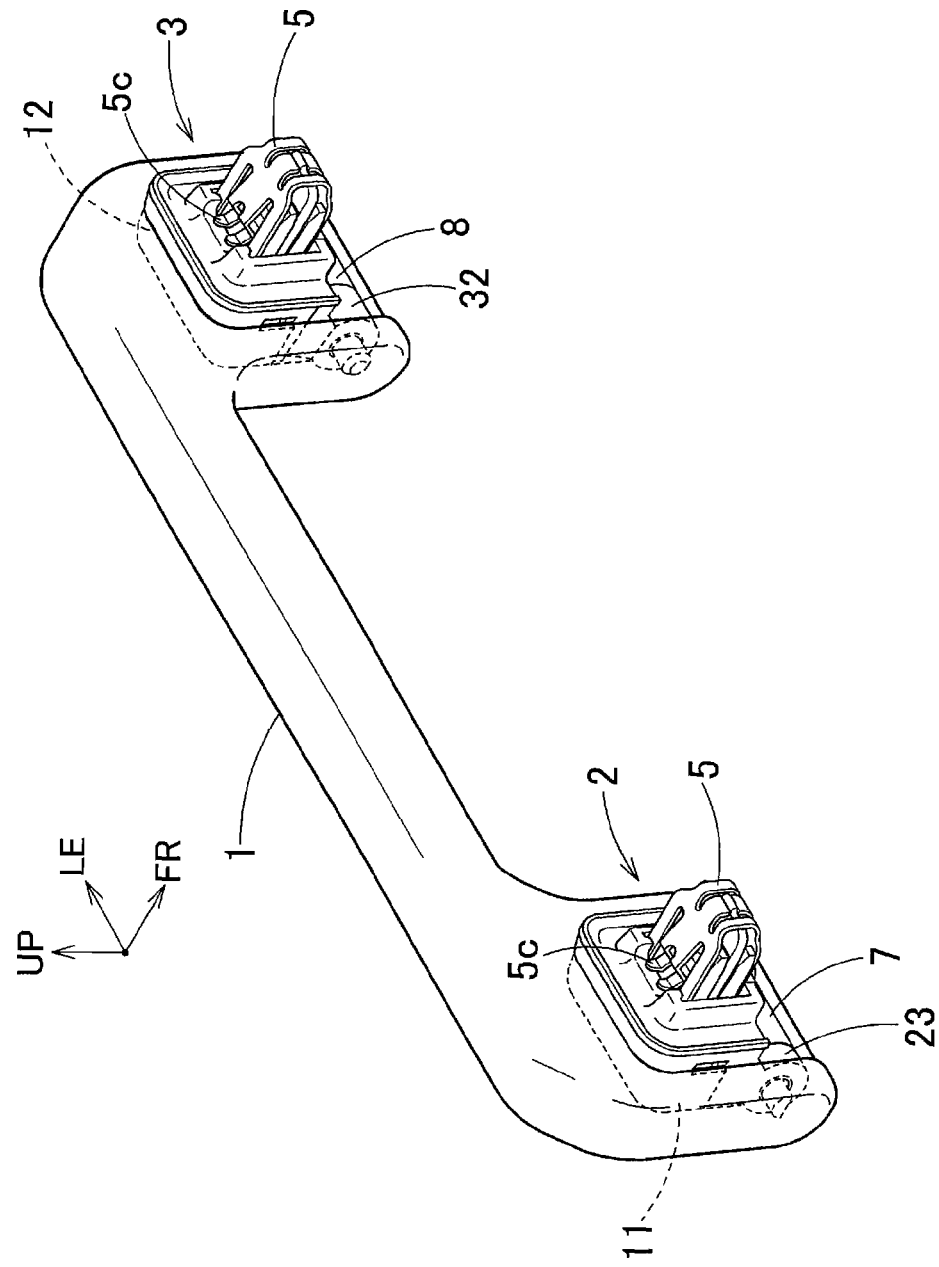
FIG. 3 is a perspective view from the back of the assist grip.
Figure 4:
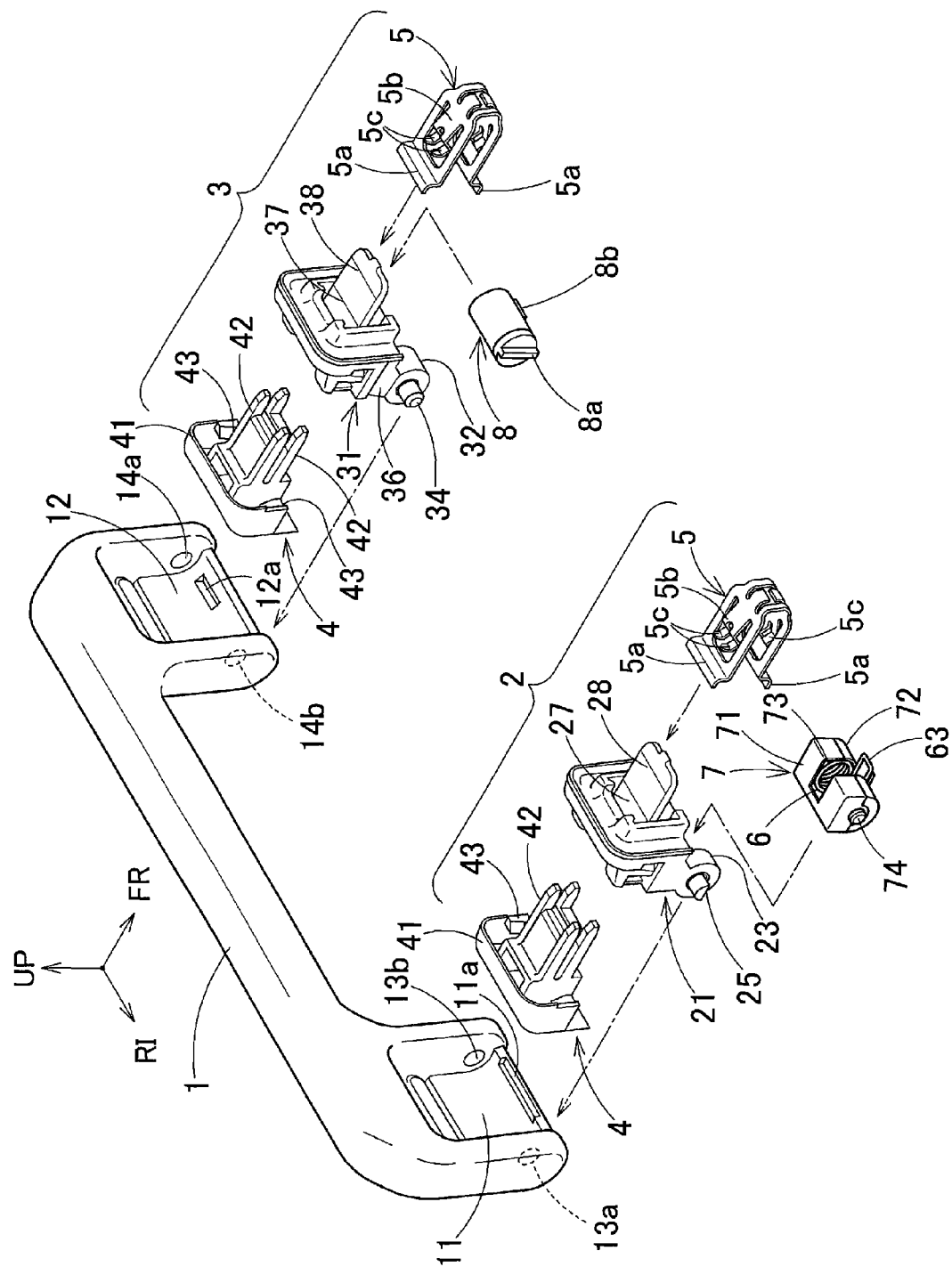
FIG. 4 is an exploded perspective view from the back of the assist grip.

FIG. 1 shows a back view of an assist grip, FIG. 2 shows a left side view thereof, FIG. 3 shows a perspective view thereof from the back, and FIG. 4 shows an exploded perspective view thereof. In addition, left, right, up, and down to be used in the following description refer to left, right, up, and down of an assist grip in a mounted posture as viewed from the front, and "FR," "LE," "RI," "UP," and "RE" used in the illustration refer to front, left, right, up, and rear, respectively.

In FIG. 1 to FIG. 4, reference numeral 1 denotes a grip body integrally molded of a synthetic resin, and the grip body 1 includes on the back of bases provided at opposite left and right ends thereof substantially rectangular hinge cavities 11 and 12, respectively. At the inside of both left and right side wall portions in the hinge cavities 11 and 12 located at opposite sides, one pair each of shaft holes 13*a* and 13*b*, 14*a* and 14*b* are formed, respectively, and outer bosses 25 and 35 that pivotally support hinge assemblies 2 and 3 to be described later are fitted into the outer shaft holes 13a and 14a, respectively, and into the inner shaft holes 13b and 14b, inner bosses 24 and 34 provided in a projecting manner on inner supports 22 and 32 of the respective hinge assemblies 2 and 3 are inserted, respectively, so that the respective hinge assemblies 2 and 3 are pivotally supported so as to be rotatable relative to the grip body 1 via the outer bosses 25 and 35 and the inner bosses 24 and 34. Because the pair of the hinge assemblies 2 and 3 is secured to the body of an automobile, the grip body 1 is made rotatable between a non-use state and an in-use state relative to the hinge assemblies 2 and 3.

The pair of hinge assemblies 2 and 3 are formed in mutually mirror symmetrical shapes, and as shown in FIG. 4, the right hinge assembly 2 includes a hinge body 21, a mounting clip 5 that is mounted by being fitted into the hinge body 21 from the back side, and inserted and engaged with a rectangular hole (not shown) on the body, a cover 4 that is fitted to the hinge body 21 so as to cover its front side and makes a clip support portion 42 enter a rectangular opening 27 in the hinge body 21 to support the mounting clip 5 from inside, a spring case 7 that is interposed between the inner support 22 and an outer support 23 provided in a projecting manner at a lower portion of the hinge body 21, and a double torsion spring 6 that is stored inside the spring case 7.

Similarly, the left hinge assembly 3 includes a hinge body 31, a mounting clip 5 that is mounted by being fitted into the hinge body 31 from the back side, and inserted and engaged with a rectangular hole (not shown) of the body, a cover 4 that is fitted to the hinge body 31 so as to cover its front side and makes a clip support portion 42 enter a rectangular opening 37 in the hinge body 31 to support the mounting clip 5 from inside, and an oil damper 8 that is inserted between the inner support 32 and an outer support 33 provided in a projecting manner at a lower portion of the hinge body 31, and applies a rotational load to the grip body 1.

Figure 6:
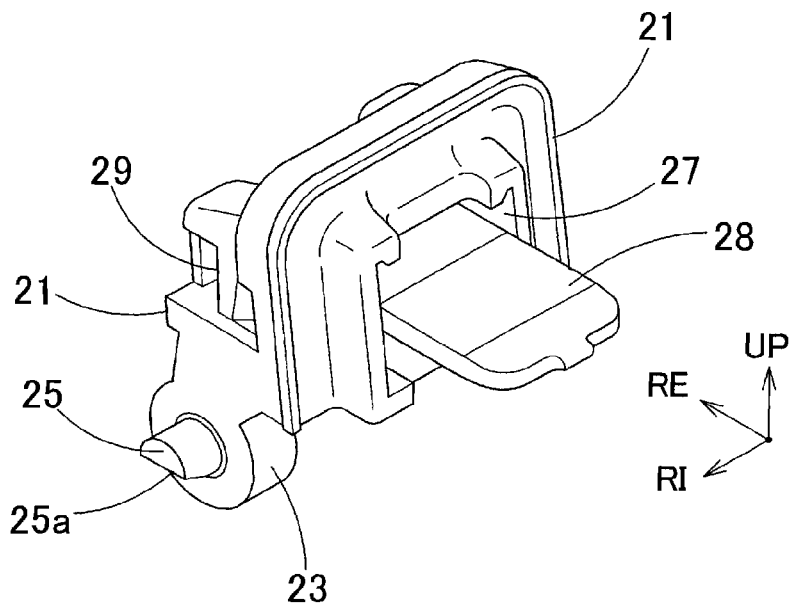
FIG. 6 is a perspective view from the back of a hinge body.
Figure 8:
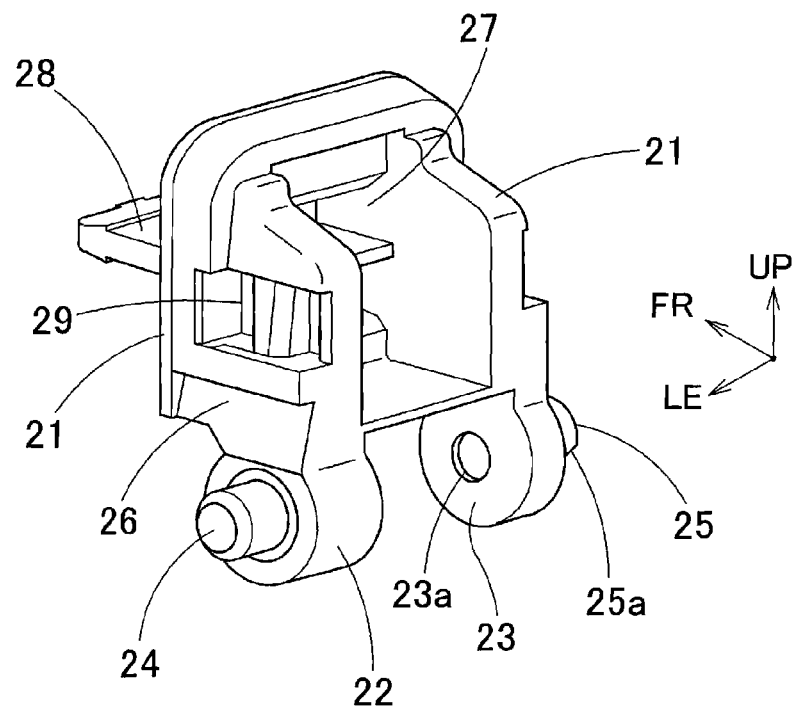
FIG. 8 is a perspective view from the front of the hinge body.

The hinge body 21 of the right hinge assembly 2 is integrally molded of a synthetic resin into a shape, as shown in FIG. 6 and FIG. 8, with the inner support 22 and the outer support 23 being provided in a projecting manner at a lower portion thereof, the rectangular opening 27 being provided substantially in the center thereof, and a center support plate 28 for supporting the mounting clip 5 being provided in a projecting manner, from a central portion of the rectangular opening 27 toward the back side. The inner boss 24 is provided in a projecting manner as a hinge shaft on an outer surface of the inner support 22 provided in a projecting manner at the lower side, while the outer boss 25 is provided in a projecting manner as a hinge shaft on an outer surface of the outer support 23. The inner boss 24 of the inner support 22 and the outer boss 25 of the outer support 23 are rotatably fitted into the shaft holes 13a and 13b drilled in both side walls of the hinge cavity 11 of the above-described grip body 1.

Figure 7:
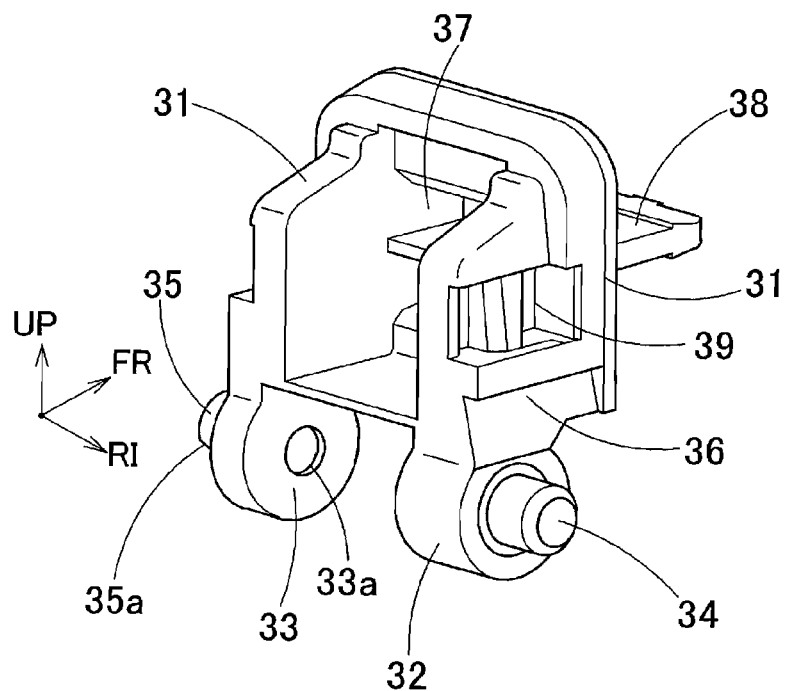
FIG. 7 is a perspective view from the front of the hinge body.

Moreover, as shown in FIG. 7 and FIG. 8, the inner support 22 of the hinge body 21 is formed with a thickness thicker than the thickness of the outer support 23 thereof, and the outer support 23 is formed with a thickness thinner than the thickness of the inner support 22, and when fitting the outer boss 25 into the shaft hole 13a, the outer support 23 is warped to allow fitting in. Moreover, forming the inner support 22 with a thickness thicker than the thickness of the outer support 23 makes it possible, when a load is applied to the inner support 22 and the inner boss 24 of the hinge assembly 2 via the grip body 1 in use of the assist grip, to reliably support the load.

On the other hand, a lower portion at the tip of the outer boss 25 provided in a projecting manner on the outer support 23 is provided in an obliquely cut shape, and therein a cut-away portion 25a (FIG. 6) is formed. The cut-away portion 25a allows, in assembly, when fitting the outer boss 25 into the shaft hole 13a, the outer boss 25 to climb over the periphery of the hinge cavity 11 of the grip body 1. Further, as shown in FIG. 8, on a basal (upper) outer surface of the inner support 22 of the hinge body 21, a notched groove 26 is formed, and the notched groove 26 allows, when fitting the hinge assembly 2 into the hinge cavity 11 of the grip body 1, the periphery of the hinge cavity 11 to enter the notched groove 26 so that the inner boss 24 and the outer boss 25 can fit in the shaft holes 13a and 13b.

The hinge body 21 is formed at both side portions with cover engaging portions 29, with which engaging pawls 43 on the cover 4 are engaged when the cover 4 to be described later is fitted to the front side of the hinge body 21. Moreover, the rectangular opening 27 formed substantially in a central portion of the hinge body 21 is formed in a shape that allows, as shown in FIG. 4 etc., inserting from its back side the mounting clip 5 to be described later and is formed in a shape that allows inserting the clip support portion 42 provided in a projecting manner on the back side of the cover 4 when the cover 4 is fitted, and substantially in the center of the rectangular opening 27, the center support plate 28 is horizontally provided in a projecting manner. The mounting clip 5 is inserted inside the rectangular opening 27 of the hinge body 21 from the back so as to cover the center support plate 28 from above and below, and an engaging portion 5a at the tip of the mounting clip 5 is engaged inside thereof.

Figure 5:
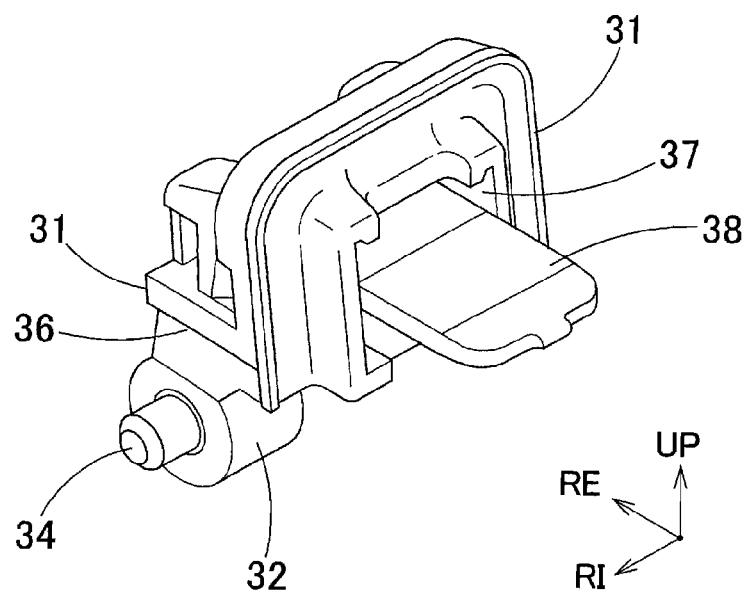
FIG. 5 is a perspective view from the back of a hinge body.

The hinge body 31 of the left hinge assembly 3 is integrally molded of a synthetic resin, as shown in FIG. 5 and FIG. 7, with the inner support 32 and the outer support 33 being provided in a projecting manner at a lower portion thereof, the rectangular opening 37 being provided substantially in the center thereof, and a center support plate 38 for supporting the mounting clip 5 being provided in a projecting manner, from a central portion of the rectangular opening 37 toward the back side. The inner boss 34 is provided in a projecting manner as a hinge shaft on an outer surface of the inner support 32 provided in a projecting manner at the lower side, while the outer boss 35 is provided in a projecting manner as a hinge shaft on an outer surface of the outer support 33, and the inner support 32 and the outer support 33 are rotatably fitted into the shaft holes 14a and 14b drilled in both side walls of the hinge cavity 12 of the above-described grip body 1.

Moreover, as shown in FIG. 7, the inner support 32 of the hinge body 31 is formed with a thickness thicker than the thickness of the outer support 33 thereof, and the outer support 33 is formed with a thickness thinner than the thickness of the inner support 32, and when fitting the outer boss 35 into the shaft hole 14a, the outer support 33 is warped to allow fitting in. Moreover, forming the inner support 32 with a thickness thicker than the thickness of the outer support 33 makes it possible, when a load is applied to the inner support 32 and the inner boss 34 of the hinge assembly 3 via the grip body 1 in use of the assist grip, to reliably support the load.

On the other hand, a lower portion at the tip of the outer boss 35 provided in a projecting manner on the outer support 33 is provided in an obliquely cut shape, and therein a cut-away portion 35a is formed. The cut-away portion 35a allows, in assembly, when fitting the outer boss 35 into the shaft hole 14a, the outer boss 35 to climb over the periphery of the hinge cavity 12 of the grip body 1. Further, as shown in FIG. 7, on a basal (upper) outer surface of the inner support 32 of the hinge body 31, a notched groove 36 is formed, and the notched groove 36 allows, when fitting the hinge assembly 3 into the hinge cavity 12 of the grip body 1, the periphery of the hinge cavity 12 to enter the notched groove 36 and the hinge assembly 3 to incline so that the inner boss 34 can fit in the shaft hole 14a.

The hinge body 31 is formed at both side portions with cover engaging portions 39, with which engaging pawls 43 on the cover 4 are engaged when the cover 4 is fitted to the front side of the hinge body 31. Moreover, the rectangular opening 37 formed substantially in a central portion of the hinge body 31 is formed in a shape that allows, as shown in FIG. 4 etc., inserting from its back side the mounting clip 5 and is formed in a shape that allows inserting the clip support portion 42 provided in a projecting manner on the back side of the cover 4 when the cover 4 is fitted, and substantially in the center of the rectangular opening 37, the center support plate 38 is horizontally provided in a projecting manner. The mounting clip 5 is inserted inside the rectangular opening 37 of the hinge body 31 from the back so as to cover the center support plate 38 from above and below, and an engaging portion 5a at the tip of the mounting clip 5 is engaged inside thereof.

As above, the mounting clip 5 is fitted into the hinge body 21, 31 with the hinge body 21, 31 described above being rotatably fitted into the hinge cavity 11, 12 of the grip body 1, and the mounting clip 5 is formed, as shown in FIG. 4, by bending a metal with spring elasticity into a substantially U-shape, and formed at opposite tip portions thereof with engaging portions 5a and 5a to be engaged with the inside of the hinge body 21, 31, by being bent in L-shapes.

Figure 16:
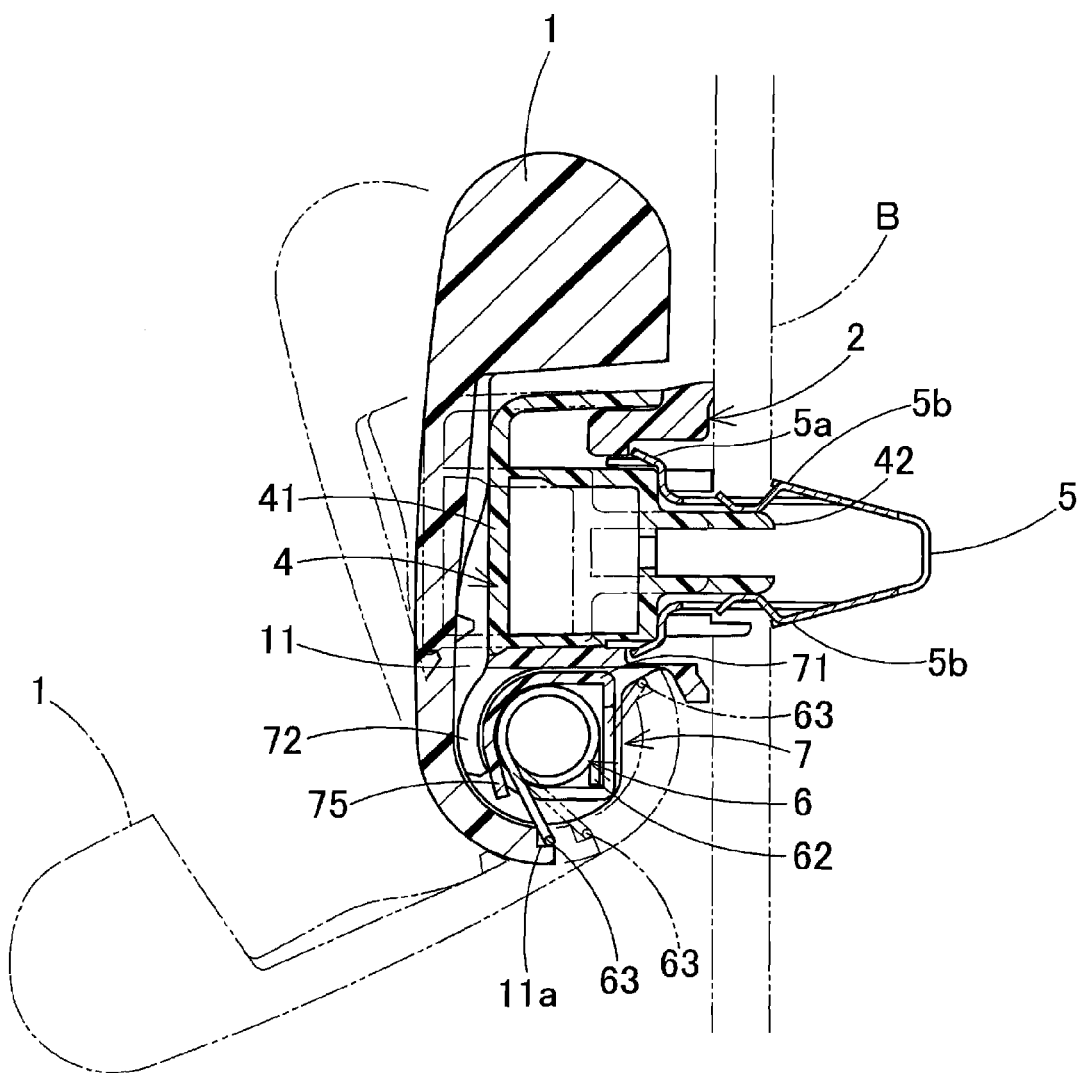
FIG. 16 is a sectional view showing an in-use state of an assist grip.

Further, the mounting clip 5 is formed at both sides in a cutting and erecting manner with bulging portions 5b so as to be elastically deformable in a widening direction, and in the bulging portions 5b at both sides, as shown in FIG. 16, retention portions to be retained by the periphery of the rectangular hole provided on a vehicle body panel B are formed. Further, at a tip portion of the bulging portion 5b, a retaining pawl 5c that, as shown in FIG. 3, is retained by the periphery of the hinge body 21, 31 when the mounting clip 5 is assembled to the hinge body 21, 31 in a manner of inserting from the back side is formed as two separated parts.

The cover 4 that is assembled so as to cover the front side of the hinge body 21, 31 is, as shown in FIG. 4, composed of a cover body 41 that covers the front of the hinge body 21, 31 and a clip support portion 42 provided projecting on the back side of the cover body 41, and on the clip support portion 42, two pairs of pointed portions to be fitted into the interior of the above-described mounting clip 5 are provided in a projecting manner, and at both side portions in the cover body 41, the engaging pawls 43 to be engaged with the cover engaging portions 29, 39 of the above-described hinge body 21, 31 are provided.

Figure 9:
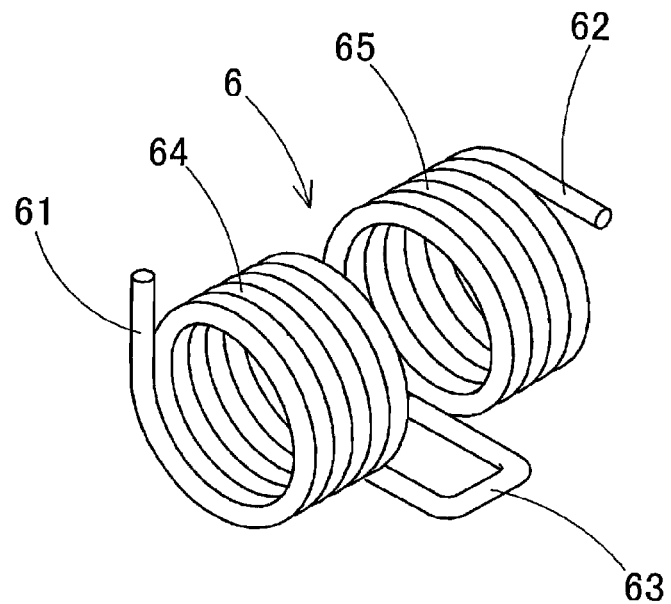
FIG. 9 is a perspective view of a double torsion spring.

On the other hand, between the inner support 22 and the outer support 23 provided in a projecting manner at a lower portion of the hinge body 21, the spring case 7 storing the double torsion spring 6 is mounted. The double torsion spring 6 to be stored inside the spring case 7 is, as shown in FIG. 9, formed with legs 61 and 62 provided in a projecting manner at opposite sides of two coil portions 64 and 65 and formed with a middle leg 63 provided in a projecting manner between the coil portions 64 and 65, and the coil portions 64 and 65 provided on both sides are wound in mutually opposite directions.

Figure 10:
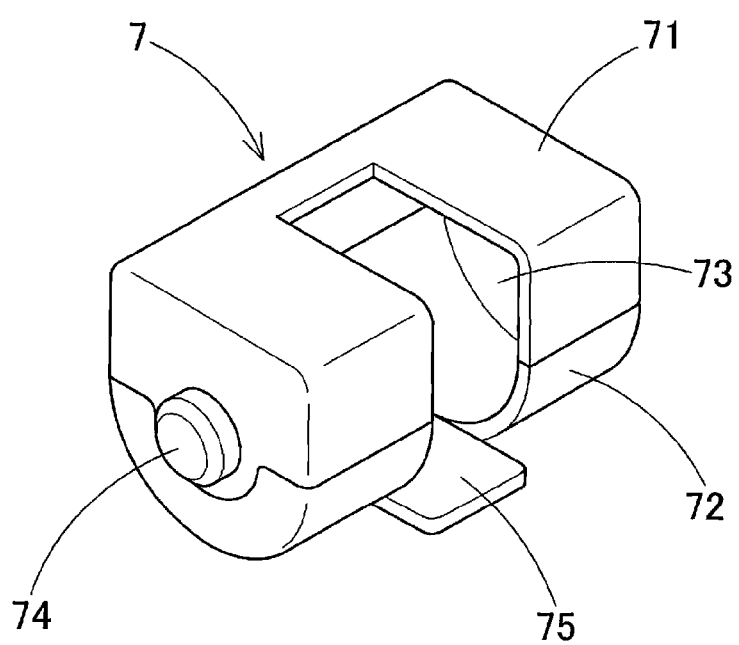
FIG. 10 is a perspective view of a spring case.
Figure 13:
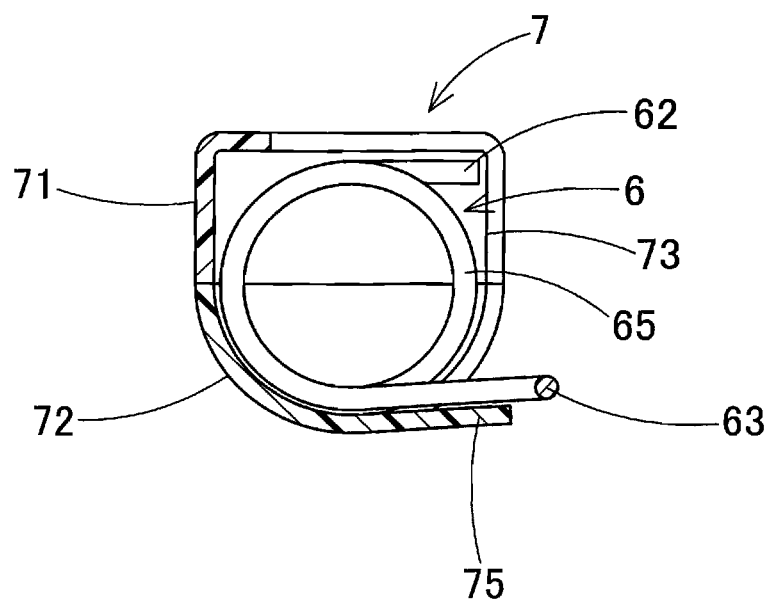
FIG. 13 is a sectional view taken along line A-A of FIG. 12.
Figure 14:
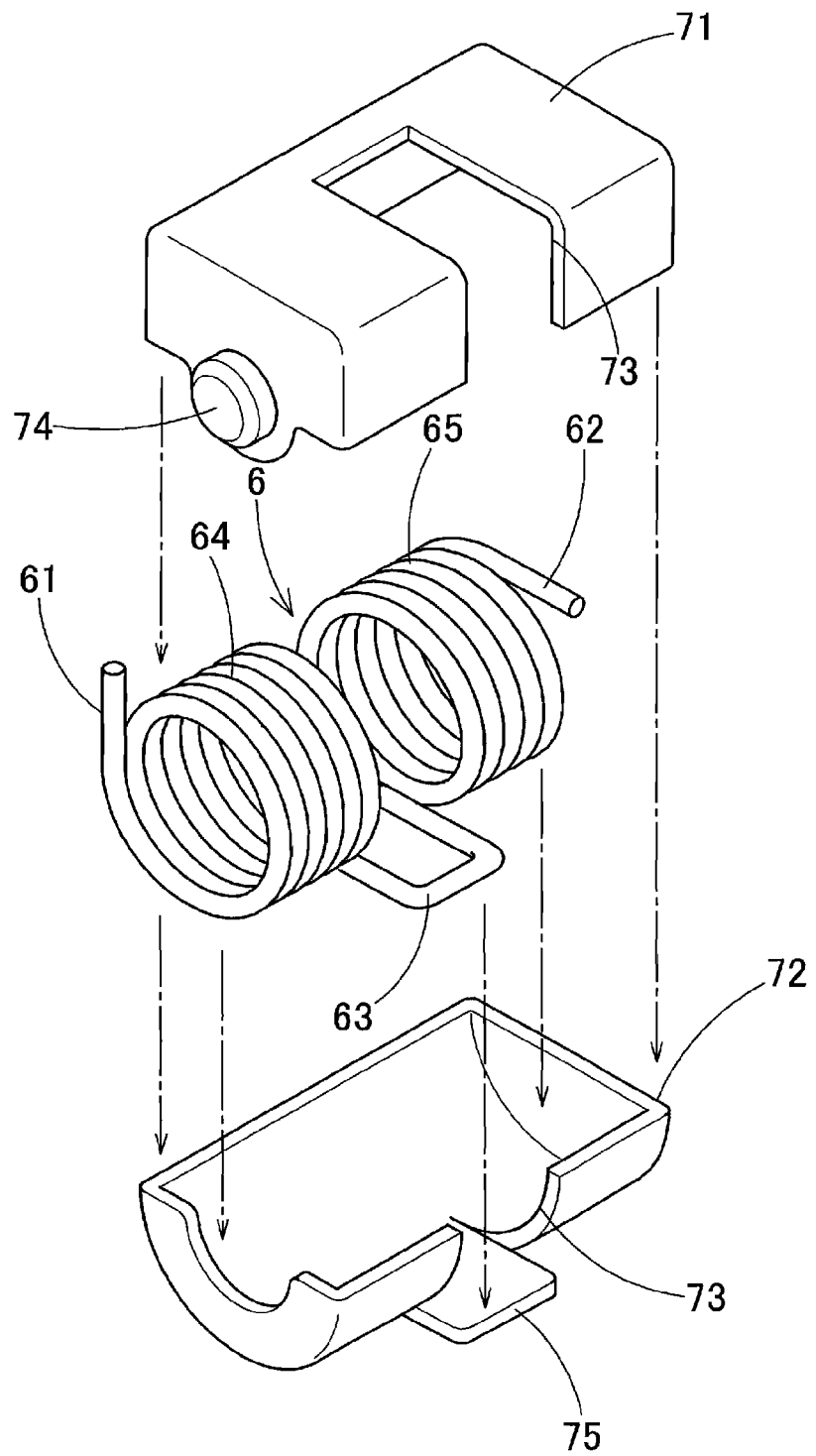
FIG. 14 is an exploded perspective view of a double torsion spring and a spring case.

The spring case 7 to store the double torsion spring 6 is, as shown in FIG. 10, composed of an upper case 71 and a lower case 72 in shapes of vertically divided cases, and formed in a size to allow insertion between the inner support 22 and the outer support 23 of the above-described hinge assembly 2. Moreover, the upper case 71 is, as shown in FIGS. 13 and 14, formed in a box shape having a rectangular parallelepiped shape opened at a lower portion and the lower case 72 is formed in a box shape opened at an upper portion to provide a structure in which the upper case 71 is placed over the lower case 72 to be fitted therewith, so that when the double torsion spring 6 is stored in the case, the legs 61 and 62 at opposite sides thereof are retained at fixed positions of an inner wall surface of the upper case 71. The spring case 7 includes a boss portion 74 provided in a projecting manner at a right-side end portion (the right side of the upper case 71), which is fitted into a boss hole 23a provided at the inside of the outer support 23 of the hinge body 21 of the hinge assembly 2.

Moreover, substantially in a central portion of the spring case 7, an opening 73 is formed from the upper case 71 to the lower case 72, and when the double torsion spring 6 is stored in the spring case 7, its middle leg 63 projects from the opening 73. As shown in FIG. 10, a support 75 is provided at the lower side of the opening 73, so that the support 75 supports the middle leg 63 projecting from the opening 73 when the double torsion spring 6 is stored inside the spring case 7. The legs 61 and 62 at opposite sides of the double torsion spring 6 abut against inner side surfaces of the upper case 71 of the spring case 7 to be supported.

Figure 15:
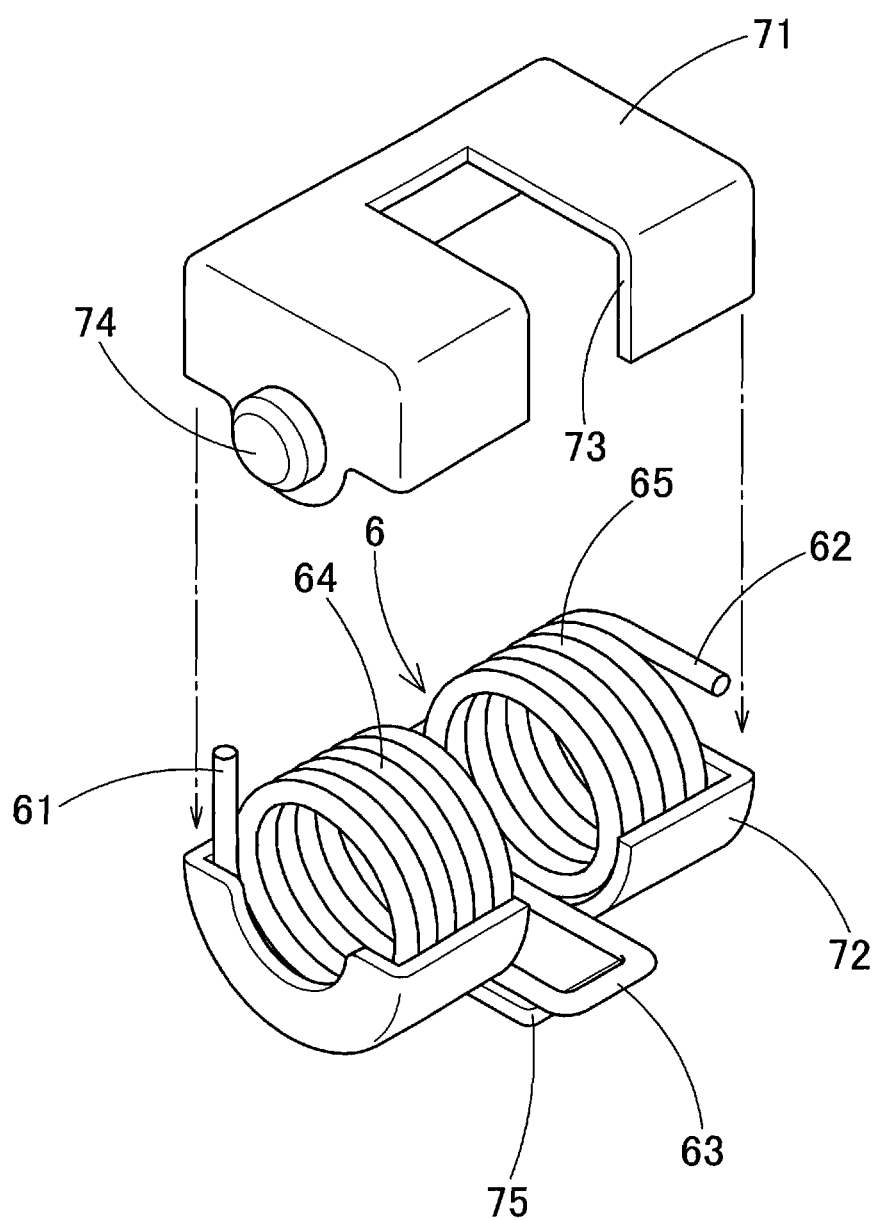
FIG. 15 is a perspective view of a state in which an upper case of a spring case has been removed.

For storing the double torsion spring 6 inside the spring case 7, as shown in FIGS. 14 and 15, first, the double torsion spring 6 is inserted inside the lower case 72, and then, the upper case 71 is fitted with the lower case 72 in a manner of placing over the same. At this time, because the lower case 72 is opened at its upper portion and its opening 73 is open to the back side, the double torsion spring 6 can be simply stored in a fixed position by only simply inserting the double torsion spring 6 inside the lower case 72.

And then, the upper case 71 is placed over the lower case 72, for which because the double torsion spring 6 has been stored in a fixed position of the lower case 72, the double torsion spring 6 and the spring case 7 can be simply assembled by only simply fitting the upper case 71 into the lower case 72 in a manner of placing over the same. Matching surfaces of the upper case 71 and the lower case 72 are bonded through, for example, thermal fusion by ultrasonic waves.

On the other hand, the spring case 7 includes a boss portion 74 provided in a projecting manner substantially at an axial center position of a right-side end face, and when mounting the spring case 7 between the outer support 23 and the inner support 22 of the hinge portion 21, the boss portion 74 is fitted into the boss hole 23a (FIG. 8) formed at an axial center position of the outer support 23.

That is, in the case of assembly of the spring case 7 storing the double torsion spring 6 to an axial center position of the inner boss 24 and the outer boss 25 of the hinge body 21, this is performed by fitting the boss portion 74 provided in a projecting manner on an outer side surface of the spring case 7 into the boss hole 23a provided at the inside of the hinge support 23.

The boss portion 74 has a minute projection length, and the spring case 7 is formed with an overall length substantially the same in dimension as the distance between the inner support 22 and the outer support 23 of the hinge body 21. Therefore, when the spring case 7 is pushed in for inserting the spring case 7 inside a space between the inner support 22 and the outer support 23, the outer support 23 having a thinner thickness warps, the spring case 7 enters into said space, the boss portion 74 is fitted into the boss hole 23a, and thus the spring case 7 can be easily assembled. Accordingly, the spring case 7 is inserted with substantially zero clearance to be assembled.

Figure 11:
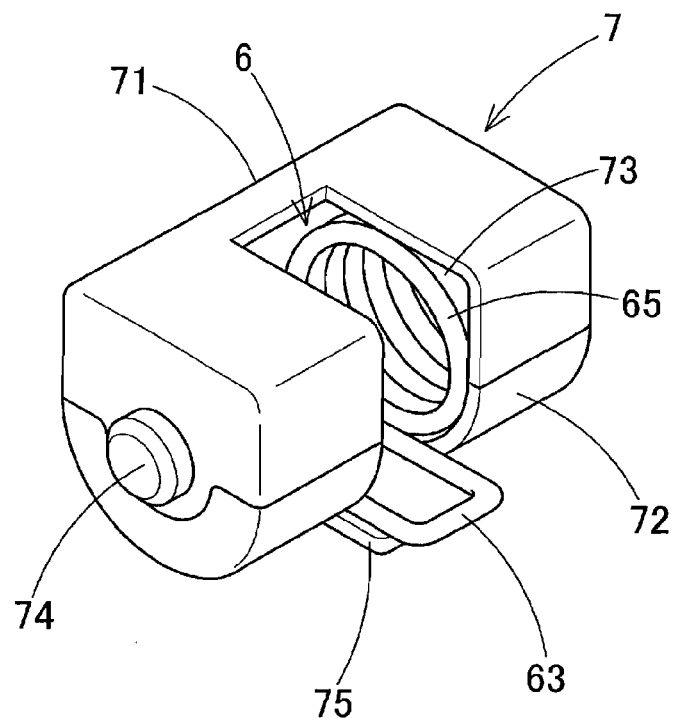
FIG. 11 is a perspective view of a spring case storing a double torsion spring.
Figure 12:
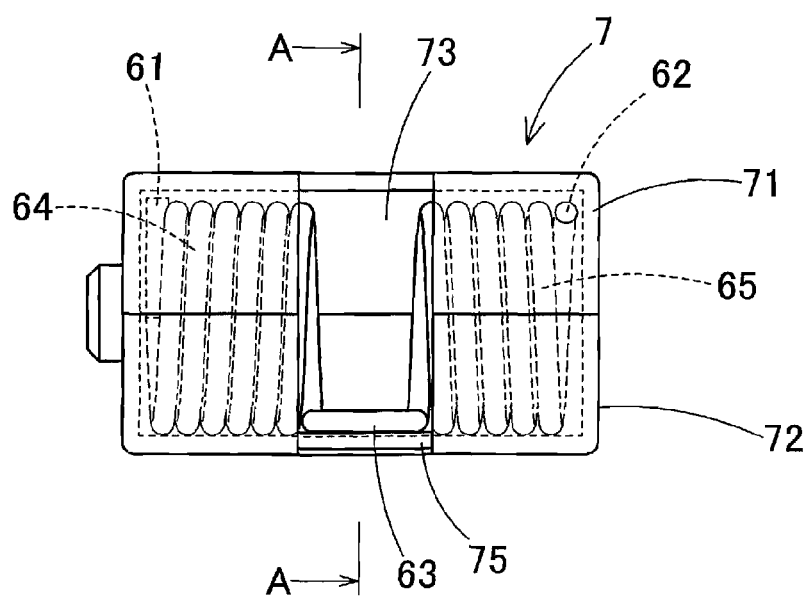
FIG. 12 is a back view of the spring case.

In the assembled state, the legs 61 and 62 at opposite end portions of the double torsion spring 6 stored in the spring case 7 are retained inside the spring case 7, and the middle leg 63 of the double torsion spring 6, as shown in FIG. 11, projects from the opening 73 of the spring case 7. Therefore, in a state where the hinge assembly 2 with the spring case 7 mounted on the hinge body 21 is stored inside the hinge cavity 11 of the grip body 1, a tip portion of the middle leg 63 of the double torsion spring 6 is held in a provided holding recess 11a.

Thus, when the double torsion spring 6 is, in a state stored in the spring case 7, disposed between the outer support 23 and the inner support 22 of the hinge assembly 2, and when the hinge assembly 2 is assembled at a fixed position in the hinge cavity 11 of the grip body 1, as shown in FIG. 16, the tip portion of the middle leg 63 of the double torsion spring 6 is held in the holding recess 11a of the hinge cavity 11 of the grip body 1, and the grip body 1 reaches a state of being biased toward the non-use position side relative to the hinge body 21 by a biasing force of the double torsion spring 6.

On the other hand, between the inner support 32 and the outer support 33 of the hinge body 31 mounted on the left hinge cavity 12, an oil damper 8 is attached as shown in FIG. 4. The oil damper 8 is arranged on the same axial center as that of the inner boss 34 and the outer boss 35 of the hinge body 31, and a tip portion 8a of a damper shaft projecting at one side thereof is fitted with the inside of the inner support 32. An engaging projection 8b provided in a projecting manner on an outer case of the oil damper 8 is engaged with an engaging recess 12a provided in the hinge cavity 12 of the grip body 1.

As a result, when the grip body 1 is rotated relative to the hinge assembly 3, the damper shaft of the oil damper 8 rotates relative to the outer case thereof, and acts so as to exert a moderate rotational resistance.

For assembling the hinge assembly 2, 3 to the grip body 1, first, the hinge body 21, 31 is assembled to the hinge cavity 11, 12 of the grip body 1, and at this time, the hinge body 21, 31 fits the inner boss 24, 34 and the outer boss 25, 35 at both sides thereof into the shaft holes 13a and 13b, 14a and 14b in the hinge cavity 11, 12.

That is, for assembling the right hinge body 21 to the hinge cavity 11 of the grip body 1, first, the hinge body 21 is inclined with respect to the hinge cavity 11 to insert a tip portion of the inner boss 24 of the inner support 22 into the shaft hole 13b. At this time, the periphery of the hinge cavity 11 enters the notched groove 26 in the base of the inner support 22 to allow insertion of the tip portion of the inner boss 24 into the shaft hole 13b.

Next, the outer support 23 of the hinge body 21 is depressed to make its outer boss 25 enter into the hinge cavity 11. At this time, the lower portion at the tip of the outer boss 25 is provided as the cut-away portion 25a, and therefore the outer boss 25 can easily enter into the hinge cavity 11, and further, because the outer support 23 is formed with a relatively thin thickness, the outer support 23 warps in a direction to insert the outer boss 25 inside the hinge cavity 11, so that the outer boss 25 enters into the hinge cavity 11. Then, further pushing and making the outer boss 25 enter up to a middle position in the hinge cavity 11 allows fitting the outer boss 25 into the shaft hole 13a.

On the other hand, for assembling the left hinge body 31 on the hinge cavity 12 of the grip body 1, first, the hinge body 31 is inclined with respect to the hinge cavity 12 to insert a tip portion of the inner boss 34 of the inner support 32 into the shaft hole 14b. At this time, the periphery of the hinge cavity 12 enters the notched groove 36 in the base of the inner support 32 to allow insertion of the tip portion of the inner boss 34 in the shaft hole 14b.

Next, the outer support 33 of the hinge body 31 is depressed to make its outer boss 35 enter into the hinge cavity 12. At this time, the lower portion at the tip of the outer boss 35 is provided as the cut-away portion 35a, and therefore the outer boss 35 can easily enter into the hinge cavity 12, and further, because the outer support 33 is formed with a relatively thin thickness, the outer support 33 warps in a direction to insert the outer boss 35 into the hinge cavity 12, so that the outer boss 35 enters into the hinge cavity 12. Then, further pushing and making the outer boss 35 enter up to a middle position in the hinge cavity 12 allows fitting the outer boss 35 into the shaft hole 14a.

Next, between the inner support 22 and the outer support 23 of the hinge body 21 mounted on the right hinge cavity 11, the double torsion spring 6 for biasing the grip body 1 toward a non-use position (a state shown by the solid line in FIG. 2) relative to the hinge assembly 2, 3 is mounted in a state inserted into the spring case 7. When the spring case 7 is pushed in for inserting the spring case 7 inside a space between the inner support 22 and the outer support 23, the outer support 23 having a thinner thickness warps, the spring case 7 enters into said space, and the boss portion 74 is fitted into the boss hole 23a, so that the spring case 7 is assembled in a non-rotating state.

Next, the mounting clips 5 and 5 are mounted on the hinge body 21 of the right hinge assembly 2 and the hinge body 31 of the left hinge assembly 3, respectively. At this time, the mounting clip 5, 5, as shown in FIG. 4, from the back side of the hinge body 21, 31, is inserted into the rectangular opening 27, 37 thereof, and from the front side of each hinge body 21, 31, the clip support portion 42, 42 of the cover 4, 4 is inserted in the rectangular opening 27, 37 thereof.

At this time, the cover 4, 4 is mounted to the front side of the hinge body 21, 31 in a provisionally mounted state (a state where the bulging portions 5b etc., of the mounting clip 5, 5 are movable when the mounting clip 5, 5 is fitted into the rectangular hole of a body panel), the mounting clip 5, 5 is, as shown in FIG. 3, fitted into a back portion of the hinge body 21, 31, the engaging portions 5a, 5a thereof are engaged with the inside of the hinge body 21, 31, and the retaining pawls 5c thereof abut against back seat portions of the hinge body 21, 31.

For mounting the assist grip on a predetermined position inside a vehicle compartment, the hinge assemblies 2 and 3 in the opposite bases thereof are pushed into rectangular holes provided on a molded ceiling material and body panel B (FIG. 16). At this time, the bulging portions 5b, 5b of the mounting clip 5, 5 contact the periphery of the rectangular hole to be elastically deformed inside (in a direction to reduce the width) while entering the rectangular hole, and when the bulging portions 5b, 5b of the mounting clip 5, 5 have been completely fitted into the rectangular hole, the periphery of the rectangular hole of the body panel is sandwiched between the retention portions of the bulging portions 5b, 5b and tip seat portions of the hinge body 21, 31 to reach a retained state.

Thereafter, the cover 4, 4 having been in a provisionally mounted state is pushed against the front of the hinge body 21, 31 such that the engaging pawls 43, 43 formed at the inside thereof completely engage with the cover engaging portions 29, 39 formed at both sides of the hinge body 21, 31. In this state, the clip support portion 42, 42 of the cover 4, 4 completely fit in the interior of the mounting clip 5, 5, which makes the mounting clip 5, 5 be tightly secured to the body panel and completes the mounting of the assist grip.

For using the assist grip, a user rotates the grip body 1 to the lower side about the left and right hinge assemblies 2, 3 to use the assist grip as shown in FIGS. 2 and 16. When the grip body 1 is pulled downward at its central region by the user, the double torsion spring 6 is, as shown in FIG. 16, held at its middle leg 63 in the holding recess 11a of the grip body 1 to rotate together with the grip body 1, and is twisted by the rotation counterclockwise in FIG. 16 against the spring force, while the legs 61 and 62 formed at opposite sides of the double torsion spring 6 keep a state retained inside the spring case 7.

When the double torsion spring 6 is twisted in response to a rotation of the grip body 1, because the double torsion spring 6 is wound at the coil portions 64 and 65 provided on both sides of the middle leg 63 in mutually opposite directions, the double torsion spring 6 keeps an axially appropriate cylindrical shape while being twisted, without inclination. Therefore, when the grip body 1 rotates, the double torsion spring 6 does not slidingly contact the spring case 7 or the coil wires do not slidingly contact each other, so that a stable rotational torque is exerted to the grip body 1. Moreover, frictional wear of the coil portions 64 and 65 of the double torsion spring 6 and the spring case 7 is prevented, and noise due to sliding contact is also prevented.

Thus, in use of the assist grip, the grip body 1 is in a state against the torsion spring force, and the user grips the grip body 1 to keep the grip body 1 in an in-use state, and at this time, a load by the user is applied via the grip body 1 to the inner bosses 24 and 34 and the outer bosses 25 and 35 of the hinge assemblies 2 and 3, and mainly to the inner bosses 24 and 34 thereof, a downward load is greatly applied.

However, this load is received by the inner bosses 24 and 34 provided in a projecting manner on the inner supports 22 and 32 with a larger thickness, and moreover, the spring case 7 or the oil damper 8 is inserted as a support member between the inner supports 22 and 32 and the outer supports 23 and 33, and therefore, the inner bosses 24 and 34 and the inner supports 22 and 32 can reliably support the load in use without warping.

On the other hand, when the user releases his/her hand from the grip body 1 in an in-use state of the assist grip, the grip body 1 rotates upward due to an upward (clockwise in FIG. 16) biasing force exerted by the middle leg 63 of the double torsion spring 6 in the spring case 7 and returns into a non-use state. Also at this time, because the double torsion spring 6 is wound at its opposed coil portions 64 and 65 in mutually opposite directions, the coils do not interfere with each other or do not interfere with the spring case, so that a stable rotational torque can be exerted to the grip body 1 to rotate the grip body 1 in a stable manner. Also, at this time, the grip body 1 returns to the non-use state position without the occurrence of frictional wear of the double torsion spring 6 and fractional wear of the spring case 7 and without the occurrence of noise due to sliding contact.

In addition, in the above-described embodiment, the inner bosses 24 and 34 and the outer bosses 25 and 35 are provided in a projecting manner on the inner supports 22 and 32 and the outer supports 23 and 33 provided at both sides of the hinge bodies 21 and 31 of the hinge assemblies 2 and 3, and when assembling the hinge assemblies 2 and 3 into the hinge cavities 11 and 12 of the grip body 1, the inner bosses 24 and 34 and the outer bosses 25 and 35 are fitted into the shaft holes 13a and 13b and 14a and 14b of the hinge cavities 11 and 12, but in place of the outer bosses 25 and 35, a structure may be provided in which shaft holes are drilled at axial center positions of the inner supports 22 and 32 and pins are prepared, and the pins are inserted from inside into the shaft holes and inserted there through up to the shaft holes 13a and 14a of the hinge cavities 11 and 12, thereby providing an arrangement so as to pivotally support the hinge assemblies 2 and 3.

Figure 17:
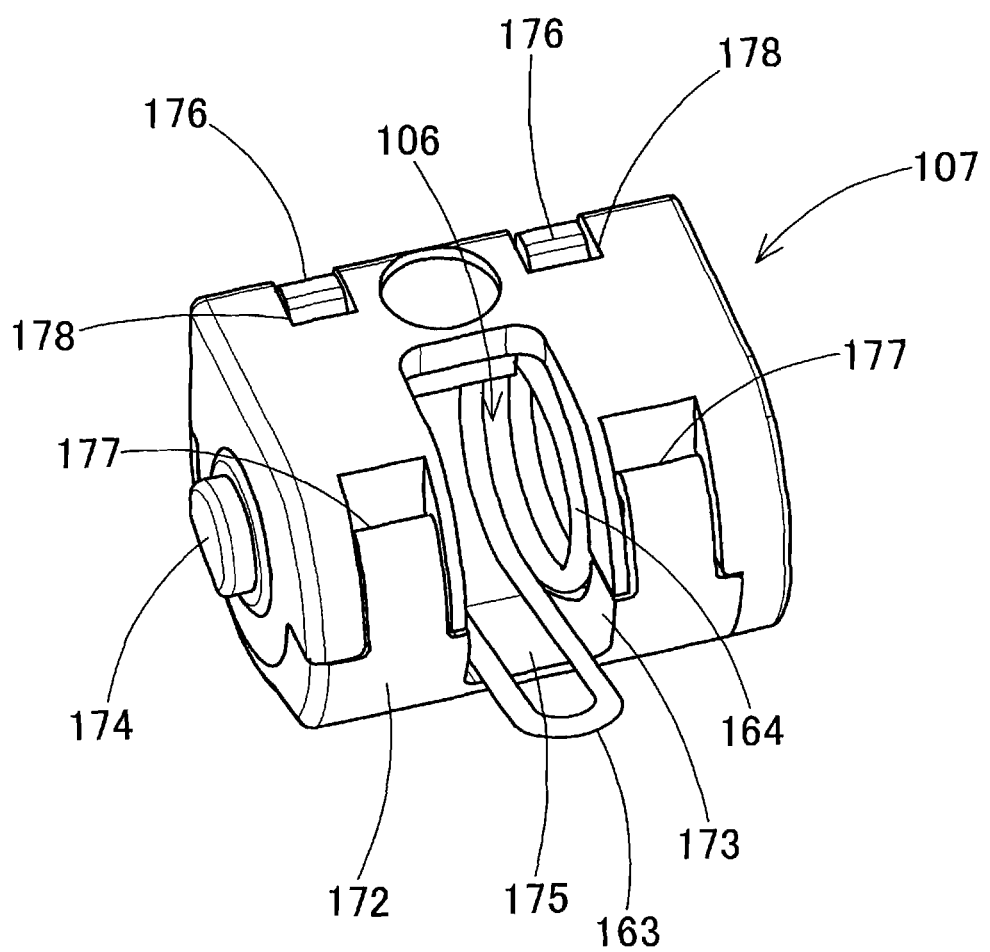
FIG. 17 is a perspective view showing a spring case of another embodiment.
Figure 18:
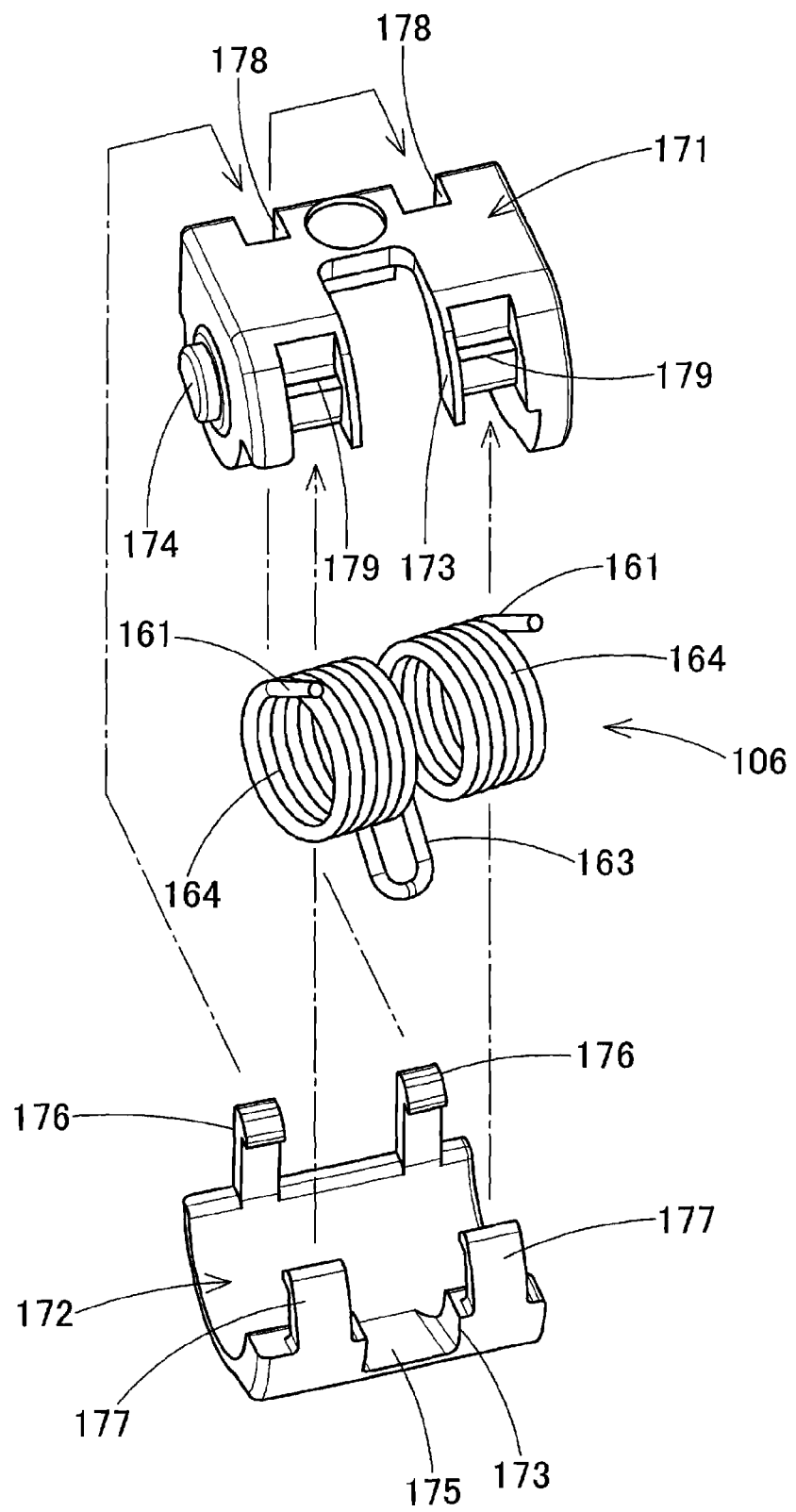
FIG. 18 is an exploded perspective view of the spring case.

FIG. 17 to FIG. 22 show a spring case 107 of another embodiment. This spring case 107 is, as shown in FIGS. 17 and 18, composed of an upper case 171 and a lower case 172 that are vertically divided, and the upper case 171 and the lower case 172 are fitted to each other with two pairs of retaining pawls 176 and 177 provided in a projecting manner in the vicinities of their engaging parts being retained by two pairs of retention portions 178 and 179 and a double torsion spring 106 being inserted inside thereof.

Similar to the above, the spring case 107 is formed in a size to allow insertion between the inner support 22 and the outer support 23 of the above-described hinge assembly 2, the upper case 171 is, as shown in FIG. 21, formed in a box shape having substantially a rectangular parallelepiped shape opened at a lower portion, and the lower case 172 is formed in a cover shape opened at an upper portion. The spring case 107 has a structure in which the lower case 172 is fitted with the upper case 171 in a manner of covering the same at the lower side, which is a structure in which, with the double torsion spring 106 being inserted inside the case, legs 161 at opposite sides thereof are retained at fixed positions of an inner wall surface of the upper case 171, and a middle leg 163 thereof projects forward from an opening 173.

The spring case 107 includes a boss portion 174 provided in a projecting manner at a left-side end portion (left side of the upper case 171 in FIG. 11), and the boss portion 174 is fitted into the boss hole 23a provided at the inside of the outer support 23 of the hinge body 21 of the above-described hinge assembly 2.

Figure 20:
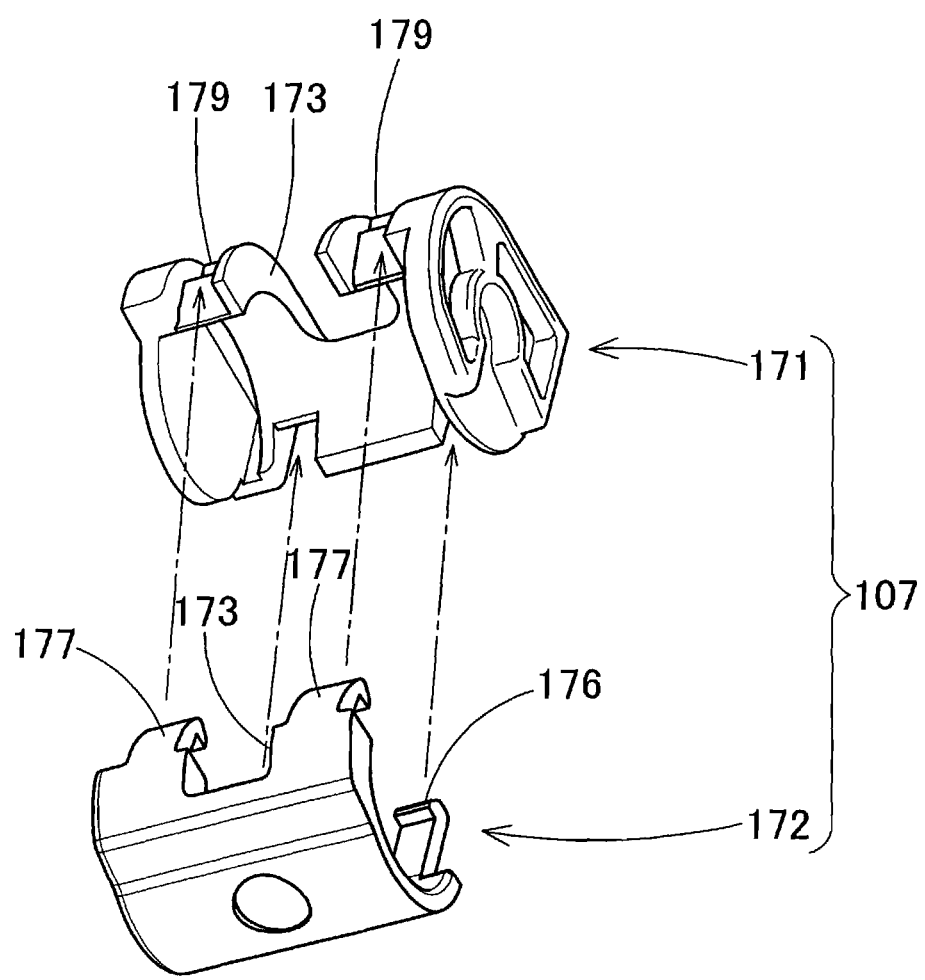
FIG. 20 is an exploded perspective view of the spring case as viewed from the lower side.
Figure 21A:
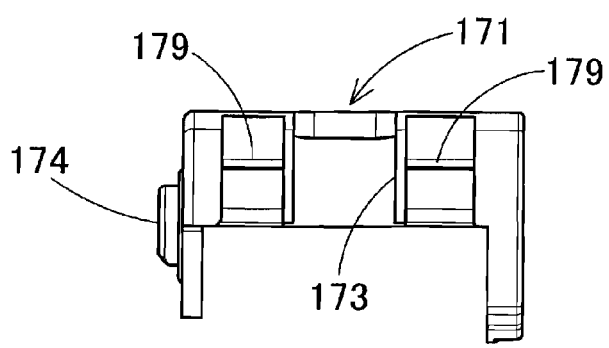
FIG. 21(*a*) is a front view of an upper case.
Figure 21B:
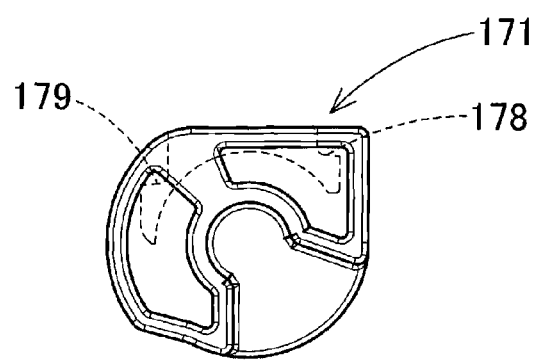
Figure 21C:
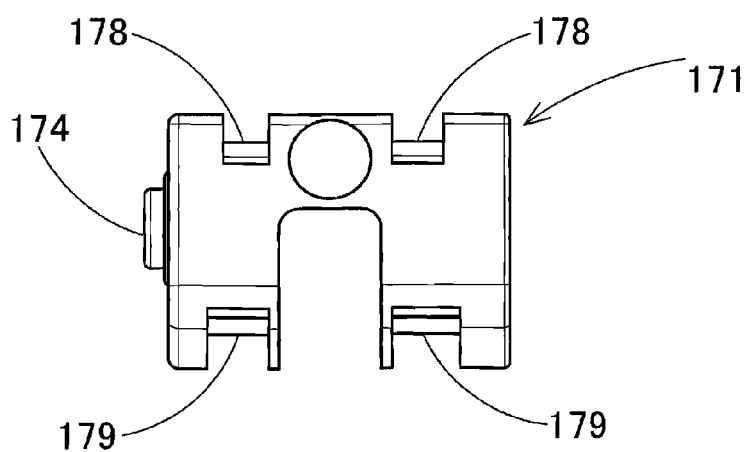
Figure 21D:
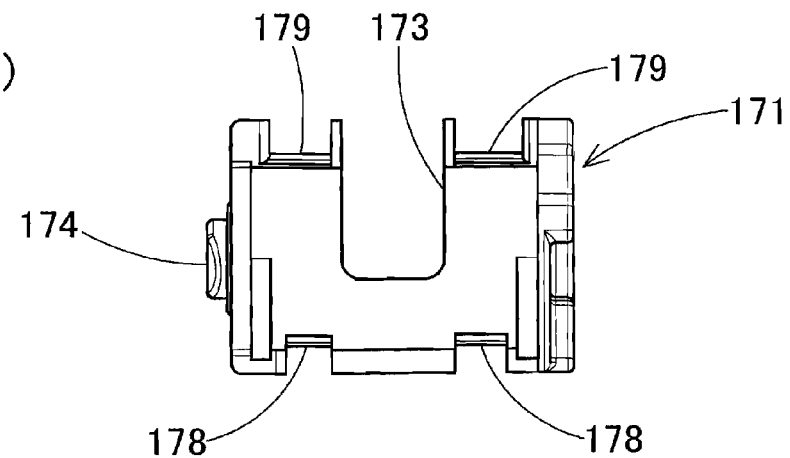

As shown in FIG. 20, substantially in a central portion of the spring case 107, an opening 173 is formed from the upper case 171 to the lower case 172, and as shown in FIG. 18, when the double torsion spring 106 is stored in the spring case 107, its middle leg 163 projects from the opening 173. As shown in FIG. 17, a support 175 is provided at the lower side of the opening 173, so that the support 175 supports the middle leg 163 projecting from the opening 173 when the double torsion spring 6 is stored inside the spring case 107. The legs 161 at opposite sides of the double torsion spring 106 abut against inner side surfaces of the upper case 171 of the spring case 107 to be supported.

Figure 22A:
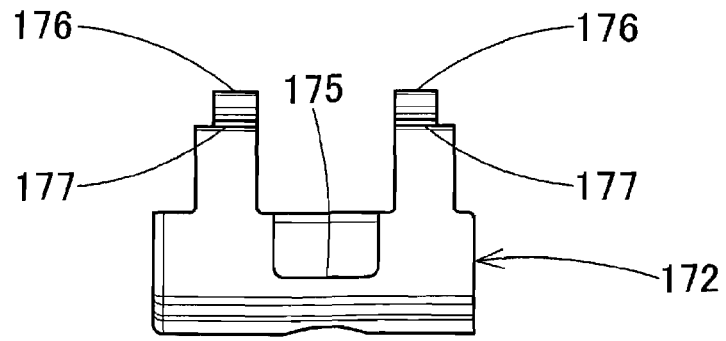
FIG. 22(*a*) is a front view of a lower case.
Figure 22B:
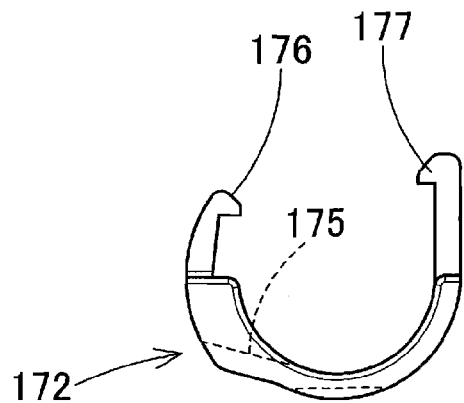
Figure 22C:
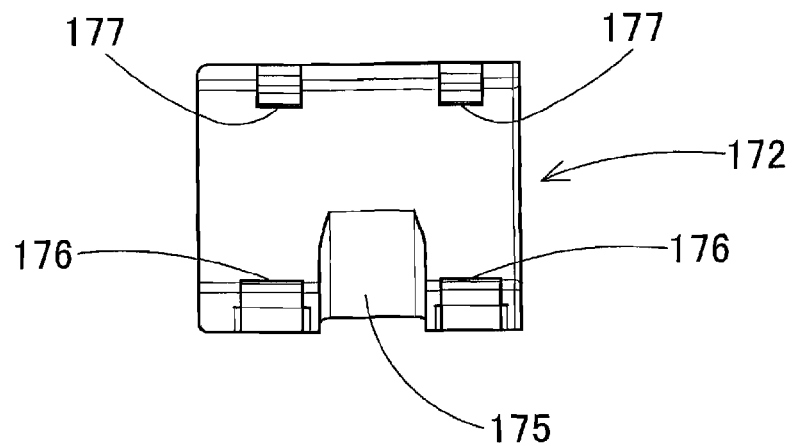

As shown in FIGS. 20 and 21, at parts with which the lower case 172 is fitted in a front portion and back portion of the upper case 171, two pairs of retention portions 178 and 179 are provided. On the other hand, as shown in FIGS. 20 and 22, at parts with which the upper case 171 is fitted in the lower case 172, two pairs of retaining pawls 176 and 177 are provided in a projecting manner facing upward. One pair of retaining pawls 176 are formed so as to be retainable by one pair of retention portions 178 of the upper case 171 and with a long length, and the other pair of retaining pawls 177 are formed so as to be retainable by the other pair of retention portions 179 of the upper case 171 and with a short length in a slightly curved manner.

Thus, as shown in FIG. 20, when the lower case 172 is fitted with the upper case 171 at the lower side, the two pairs of retaining pawls 176 and 177 are retained by the two pairs of the retention portions 178 and 179 of the upper case 171, so that the upper case 171 and the lower case 172 are fitted to each other.

Figure 19:
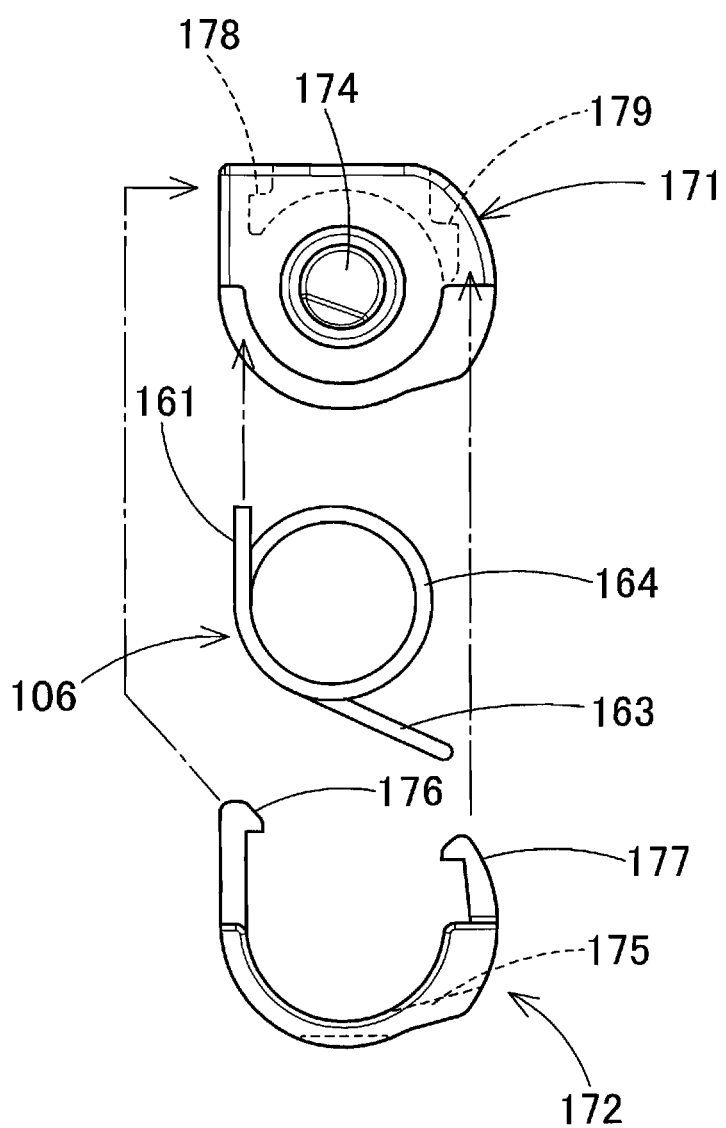
FIG. 19 is an exploded left side view of the spring case.

When the double torsion spring 106 is stored inside the spring case 107 for assembly, as shown in FIGS. 18 and 19, first, the double torsion spring 106 is inserted inside the upper case 171 from the lower side, next, the lower case 172 is located in a manner of covering the upper case 171 at the lower side to make one pair of retaining pawls 176 of the lower case 172 be retained by one pair of retention portions 178 of the upper case 171.

In this state, the lower case 172 is in a half-open state with respect to the upper case 171, and the middle leg 163 of the double torsion spring 106 is located in the opening 173 of the lower case 172. That is, the double torsion spring 106 is provisionally stored with its legs 161 being inserted in the vicinity of side walls inside the upper case 171, and the lower case 172 has its only one side pair of retaining pawl 176 hooked into the retention portion 178 of the upper case 171 to reach a swingable state.

Next, the lower case 172 is moved relative to the upper case 171 so as to swing to the upper side about the fulcrum of the pair of retaining pawls 176, that is, the lower case 172 is swung about the fulcrum of the pair of retaining pawls 176 counterclockwise in FIG. 19. Then, the other pair of retaining pawls 177 of the lower case 172 are pushed up from the lower side to the upper side in FIG. 19 in a manner of pushing into the retention portions 179 of the upper case 171 to make the other pair of retaining pawls 177 be retained by the retention portions 179 of the upper case 171.

At this time, the double torsion spring 106 in the upper case 171, the legs 161 at opposite sides of which are abutted against the side walls in the upper case 171, is slightly twisted at its middle leg 163 against the spring force to the upper side in FIGS. 18 and 19, and the pair of retaining pawls 177 are retained by the retention portions 179 of the upper case 171 in that state.

Accordingly, in the spring case 1 composed of the upper case 171 and the lower case 172, as shown in FIG. 17, the double torsion spring 106 is stored with a slight torsion spring force generated and the middle leg 163 thereof is in a state projected from the opening 173, and the upper case 171 and the lower case 172 of the spring case 107 are fitted to each other by retention of the two pairs of retaining pawls 176 and 177 and retention portions 178 and 179.

In addition, a description has been given in the above, with reference to FIGS. 18 and 19, of assembling the lower case 172 by pushing up onto the upper case 171, but of course, the state of the cases in FIGS. 18 and 19 may be inverted upside down so as to assemble the lower case 172 opened at the lower side over the upper case 171 opened at the upper side in a covering manner. Alternatively, conversely to the above, retaining pawls may be provided on the upper case in a projecting manner facing downward, and retention portions may be provided on the lower case.

Thus, the spring case 107 including the upper case 171 and the lower case 172 can be relatively simply assembled with the double torsion spring 106 stored inside and an appropriate torsion spring force generated, and the double torsion spring 106 can be satisfactorily stored in a fixed position without rattling inside the spring case 107. Hence, the assembling work for the spring case 107 containing the double torsion spring 106 in manufacturing can be effectively performed very simply and with fewer man-hours.

Similar to the above, the spring case 107 storing the double torsion spring 106 is assembled to an axial center position of the inner boss 24 and the outer boss 25 of the above-described hinge body 21. At this time, the spring case 107 is, by fitting the boss portion 174 provided in a projecting manner on its outer side surface into the boss hole 23a provided at the inside of the outer support 23 of the hinge body 21, assembled in a non-rotating state between the inner support 22 and the outer support 23 of the hinge body 21.

In the assembled state, the legs 161 at opposite end portions of the double torsion spring 106 stored in the spring case 107 are retained inside the spring case 107, while the middle leg 163 of the double torsion spring 106 projects from the opening 173 of the spring case 107, and similar to the above-described embodiment shown in FIG. 16, the tip of the middle leg 163 is held in a holding recess 11a of the hinge cavity 11 of the grip body 1. Hence, the double torsion spring 106 reaches a state of biasing the grip body 1 clockwise in FIG. 16, and the assist grip with such a spring case 107 mounted is biased at the grip body 1 toward the non-use position side relative to the hinge body 21 by a biasing force of the double torsion spring 106.

Similar to the above, the assist grip with the spring case 107 mounted keeps an axially appropriate cylindrical shape while being twisted, without inclination in the spring portion because the coil portions 164 at both sides of the double torsion spring 106 are wound in mutually opposite directions when the double torsion spring 106 is twisted in response to a rotation of the grip body 1.

Therefore, when the grip body 1 rotates, the double torsion spring 6 does not slidingly contact the spring case 7 or the coil wires do not slidingly contact each other, and a stable rotational torque can be exerted to the grip body 1, and also, frictional wear of the spring member and spring case can be prevented to prevent the occurrence of noise.

In assembly of the assist grip, assembling work of the spring case 107 storing the double torsion spring 106 into the hinge body 21 of the hinge assembly 2 can be easily performed with the grip body 1 being biased toward the non-use position side, so that assembling work of the assist grip can be efficiently performed with fewer man-hours.

While at least one exemplary embodiment has been presented in the foregoing summary and detailed description, it should be appreciated that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. An assist grip, comprising:
  hinge cavities on opposite bases of a grip body;
  hinge assemblies rotatably pivotally supported inside the hinge cavities at opposite sides, respectively, which is secured to mounting locations inside a vehicle via the hinge assemblies,
  an outer support and an inner support in a pivot support portion of the hinge assembly at a distance from each other; and
  a spring case storing a spring inserted in a non-rotating state between the inner support and outer support, and the grip body is biased toward a non-use position side by the spring,
  wherein a double torsion spring is stored inside the spring case as the spring, legs at opposite sides of the double torsion spring are retained at an inside of the spring case, and a middle leg of the double torsion spring projects from the spring case to be retained by a part of the grip body.

2. An assist grip according to claim 1,
  wherein the spring case is made up of an upper case and a lower case fitted with the upper case at a lower side, and wherein an opening is provided in a middle portion between the upper case and the lower case, and the middle leg of the double torsion spring projects from the opening, and is retained by a portion of the grip body.

3. An assist grip according to claim 1, further comprising:
a boss hole at an inside of an axial center position of the outer support serving as the pivot support portion of the hinge assembly; and
a boss portion in a projecting manner on an end face of the spring case, and the boss portion of the spring case fitted into the boss hole of the outer support to assemble the spring case between the inner support and the outer support of the hinge assembly.

4. An assist grip according to claim 2, wherein the upper case and the lower case of the spring case are provided at parts to be fitted with each other with a plurality of retaining pawls and a plurality of retention portions, and the upper case and the lower case of the spring case, which have stored the double torsion spring, are fitted by making the retaining pawls be retained by the retention portions.

5. An assist grip according to claim 4, wherein the double torsion spring with a torsion spring force generated by twisting between the middle leg and the legs at opposite sides is stored inside the spring case.

6. An assist grip according to claim 5, wherein the double torsion spring is stored in the spring case by making one retaining pawl of the upper case or the lower case be retained by one retention portion of the lower case or the upper case with the double torsion spring provisionally stored inside the upper case, and then moving the lower case to twist the double torsion spring so as to generate the torsion spring force, while making the other retaining pawl be retained by the other retention portion.

* * * * *